US012675350B2

(12) United States Patent (10) Patent No.: US 12,675,350 B2
Jung et al. (45) Date of Patent: Jul. 7, 2026

(54) METHOD AND APPARATUS FOR PROVIDING CLOUD-BASED API SERVICE

(71) Applicant: SAMSUNG SDS CO., LTD., Seoul (KR)

(72) Inventors: Young Il Jung, Seoul (KR); Young Hoon Ahn, Seoul (KR); Mok Young Jeong, Seoul (KR); Soon Hong Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 145 days.

(21) Appl. No.: 18/680,007

(22) Filed: May 31, 2024

(65) Prior Publication Data

US 2024/0403150 A1 Dec. 5, 2024

(30) Foreign Application Priority Data

May 31, 2023 (KR) ......................... 10-2023-0070210

(51) Int. Cl.
*G06F 9/54* (2006.01)
*H04L 9/40* (2022.01)

(52) U.S. Cl.
CPC .............. *G06F 9/547* (2013.01); *H04L 63/08* (2013.01)

(58) Field of Classification Search
CPC .. G06F 9/547; G06F 2221/2141; G06F 21/62; G06F 21/629; G06F 9/541; H04L 63/08; H04L 63/10; H04L 67/10; H04L 63/062; H04L 63/102; H04L 67/50; G06N 20/00; G06V 10/10; G06V 30/10
See application file for complete search history.

(56) References Cited

U.S. PATENT DOCUMENTS

| | | | |
|---|---|---|---|
| 10,109,030 B1 | 10/2018 | Sun et al. | |
| 11,252,157 B1 | 2/2022 | Khanna et al. | |
| 11,563,636 B1 | 1/2023 | Kairali et al. | |
| 2007/0294695 A1* | 12/2007 | Jensen .................. | G06F 9/4843 718/102 |
| 2008/0098465 A1* | 4/2008 | Ramakrishna .......... | G06F 21/10 726/5 |
| 2014/0026203 A1* | 1/2014 | Ho ........................ | H04L 63/168 726/9 |

(Continued)

FOREIGN PATENT DOCUMENTS

| | | |
|---|---|---|
| KR | 10-2341377 B1 | 12/2021 |
| KR | 10-2392739 B1 | 5/2022 |
| KR | 10-2483313 B1 | 1/2023 |

OTHER PUBLICATIONS

Korean Office Action issued on Oct. 17, 2025, in corresponding Korean Patent Application No. 10-2023-0070210. (5 pages in Korean).

(Continued)

*Primary Examiner* — Javier O Guzman
(74) *Attorney, Agent, or Firm* — NSIP Law

(57) ABSTRACT

A method for providing a cloud-based application programming interface (API) service is provided. The method may include issuing an authentication key corresponding to an application for some of a plurality of API services, performing authentication for a first user using the issued authentication key in response to a call for a first API service by the first user, and executing the first API service based on a result of the authentication.

20 Claims, 12 Drawing Sheets

(56) References Cited

U.S. PATENT DOCUMENTS

| | | | |
|---|---|---|---|
| 2014/0075517 A1* | 3/2014 | Alrabady | G06F 21/572 |
| | | | 726/4 |
| 2020/0145421 A1* | 5/2020 | Tin | H04L 9/0866 |
| 2020/0257479 A1* | 8/2020 | Kunimatsu | G06F 3/1234 |
| 2020/0322324 A1* | 10/2020 | Chang | G06F 9/54 |
| 2021/0157692 A1* | 5/2021 | MacCarthaigh | G06F 11/0757 |
| 2021/0406102 A1* | 12/2021 | Seetharaman | H04L 67/535 |
| 2023/0410543 A1* | 12/2023 | Chatzistamatiou | G06F 40/106 |
| 2024/0020143 A1* | 1/2024 | Shtarbev | G06F 21/1064 |

OTHER PUBLICATIONS

Extended European search report issued on Aug. 12, 2024, in counterpart European Patent Application No. 24178426.3 (4 pages).

* cited by examiner

START

ISSUE AUTHENTICATION KEY CORRESPONDING TO
APPLICATION FOR SOME OF PLURALITY OF API SERVICES ———S100

PERFORM AUTHENTICATION FOR FIRST USER USING ISSUED AUTHENTICATION
KEY IN RESPONSE TO CALL TO FIRST API SERVICE BY FIRST USER ———S200

EXECUTE FIRST API SERVICE BASED ON RESULT OF AUTHENTICATION ———S300

END

S330

GENERATE JOB FOR API SERVICE AND
INSERT JOB INTO QUEUE    S331

FETCH JOB FROM QUEUE AND VERIFY VALIDITY OF JOB    S332

PROCESS JOB WHEN JOB IS VALID    S333

S300

PROVIDE JOB ID TO FIRST USER ~ S340

GENERATE JOB FOR FIRST API SERVICE AND INSERT JOB INTO QUEUE ~ S350

FETCH JOB FROM QUEUE AND VERIFY VALIDITY OF JOB ~ S360

PROCESS JOB WHEN JOB IS VALID ~ S370

METHOD AND APPARATUS FOR PROVIDING CLOUD-BASED API SERVICE

CROSS-REFERENCE TO RELATED APPLICATION

This application claims priority from Korean Patent Application No. 10-2023-0070210 filed on May 31, 2023, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method and apparatus for providing a cloud-based application programming interface (API) service, and more particularly, to a method for providing and managing a plurality of API services through a cloud environment integrated into one area and a system to which the method is applied.

2. Description of the Related Art

A plurality of API services utilizing AI models may be provided to users. In this case, when an environment for providing a plurality of AI-based API services is built in an on-premise format, it may take a lot of time to build a Graphics Processing Unit (GPU) infrastructure and develop a Machine Learning (ML) model. In addition, when each API service is individually provided instead of being provided to the users in the form of a cloud-based integrated API service, the cost of building and operating the service environment may increase.

Accordingly, technology is required to minimize the development and operating costs of the AI-based API services, improve user convenience of operation, and stably provide the services to the users.

SUMMARY

Aspects of the present disclosure provide a method and apparatus that may integrally provide a plurality of cloud-based API services to a user.

Aspects of the present disclosure also provide a method and apparatus that may efficiently manage a plurality of AI-based API services provided to a user from a cloud service provider's perspective.

Aspects of the present disclosure also provide a method and apparatus for providing an API service using an architecture designed to elastically and stably provide deep learning model service resources in a control plane area of a cloud service provider when calling an API.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to the present exemplary embodiment, the server and management costs may be reduced by utilizing common infrastructure and middleware built in the control plane area of the cloud service provider.

According to the present exemplary embodiment, related costs may be effectively reduced by designing and using an architecture configured by integrating the plurality of API services in one area in a centralized Software as a Service (SaaS) type service rather than an architecture that individually configures the plurality of API services.

According to the present exemplary embodiment, user satisfaction and convenience may be improved by providing the API services through linking with various cloud products such as object storage and machine learning platforms.

According to the present exemplary embodiment, service development and operation costs may be reduced by utilizing integrated resources when developing or operating various AI-based API services.

According to an aspect of the inventive concept, there is a method for providing a cloud-based application programming interface (API) service. The method may include: issuing an authentication key corresponding to an application for some of a plurality of API services, performing authentication for a first user using the issued authentication key in response to a call for a first API service by the first user, and executing the first API service based on a result of the authentication.

In some embodiments, executing of the first API service may include: acquiring analysis target data from a linked storage, and generating an analysis result for the analysis target data by executing the first API service.

In some embodiments, the plurality of API services may include an artificial intelligence (AI)-based character recognition service, an AI-based text analysis service, and an AI-based image analysis service.

In some embodiments, executing of the first API service may include: checking a permission of the first user for the first API service, and executing the first API service only when the first user has the permission.

In some embodiments, the plurality of API services may be data analysis services, and the first API service may be executed on a graphics processing unit (GPU)-based worker node.

In some embodiments, executing of the first API service may include: generating a job for the first API service and inserting the job into a queue, fetching the job from the queue and verifying validity of the job, and processing the job when the job is valid.

In some embodiments, the validity of the job may be verified based on at least one of an extension name of the analysis target data file and a capacity of the analysis target data file.

In some embodiments, the first API service may be an asynchronous type API service, and executing of the first API service may include: generating a job for the first API service and processing the generated job, and providing an ID of the job to the first user before processing the job.

In some embodiments, generating of the job for the first API service and the processing of the generated job may include: generating a job for the first API service and inserting the job into a queue, fetching the job from the queue and verifying validity of the job, and processing the job when the job is valid.

In some embodiments, processing of the job when the job is valid may include: separating the job into a plurality of tasks based on preset conditions, verifying validity of a first task, which is one of the plurality of tasks, processing the first task when the first task is valid, and repeating the verifying of the validity of the first task and the processing of the first task until all of the plurality of tasks are processed.

In some embodiments, the validity of the first task may be verified based on at least one of an extension name of an analysis target data file of the first task and a capacity of the analysis target data file of the first task.

In some embodiments, the method may further comprise uploading a processing result of the job to a storage according to an option preset by the first user.

In some embodiments, the method may further comprise providing information about a status of the job to the first user in response to a status inquiry request of the job by the first user, wherein the status inquiry request of the job may include information about an ID of the job.

According to another aspect of the inventive concept, there is a method for providing a cloud-based application programming interface (API) service. The method may include: receiving a call for a first API service from a first user input through a screen of a demo management console, checking a permission of the first user for the first API service in response to the received call, and executing the first API service only when the first user has the permission, wherein the first API service may be an API service selected by the first user among a plurality of API services, and the demo management console may provide on trial an execution result for an API service selected by a specific user among the plurality of API services.

According to another aspect of the inventive concept, there is a system for providing a cloud-based application programming interface (API) service. The system may include: a processor, and a memory configured to store instructions, the instructions cause the processor, when executed by the processor, to perform operations of: issuing an authentication key corresponding to an application for some of a plurality of API services, performing authentication for a first user using the issued authentication key in response to a call for a first API service by the first user, and executing the first API service based on a result of the authentication.

In some embodiments, executing of the first API service may include: acquiring analysis target data from a linked storage, and generating an analysis result for the analysis target data by executing the first API service.

In some embodiments, the first API service may be an asynchronous type API service, and executing of the first API service may include: generating a job for the first API service and processing the generated job, and providing an ID of the job to the first user before processing the job.

In some embodiments, generating of the job for the first API service and the processing of the generated job may include: generating a job for the first API service and inserting the job into a queue, fetching the job from the queue and verifying validity of the job, and processing the job when the job is valid.

In some embodiments, processing of the job when the job is valid may include: separating the job into a plurality of tasks based on preset conditions, verifying validity of a first task, which is one of the plurality of tasks, processing the first task when the first task is valid, and repeating the verifying of the validity of the first task and the processing of the first task until all of the plurality of tasks are processed.

In some embodiments, the validity of the first task may be verified based on at least one of an extension name of an analysis target data file of the first task and a capacity of the analysis target data file of the first task.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In describing the present disclosure, when it is determined that the detailed description of the related well-known configuration or function may obscure the gist of the present disclosure, the detailed description thereof will be omitted.

Unless otherwise defined, terms used in the following embodiments (including technical and scientific terms) may be used in a meaning that can be commonly understood by those of ordinary skill in the art to which the present disclosure belongs, but this may vary depending on the intention of engineers working in the related field, precedents, and the emergence of new technologies. Terminology used in this disclosure is for describing the embodiments and is not intended to limit the scope of the disclosure.

Expressions in the singular number used in the following embodiments include plural concepts unless the context clearly indicates that the singular number is specified. Also, plural expressions include singular concepts unless clearly specified as plural in context.

In addition, terms such as first, second, A, B, (a), and (b) used in the following embodiments are only used to distinguish certain components from other components, and the terms does not limit the nature, sequence, or order of the components.

Hereinafter, embodiments of the present disclosure are described with reference to the accompanying drawings.

Figure 1:
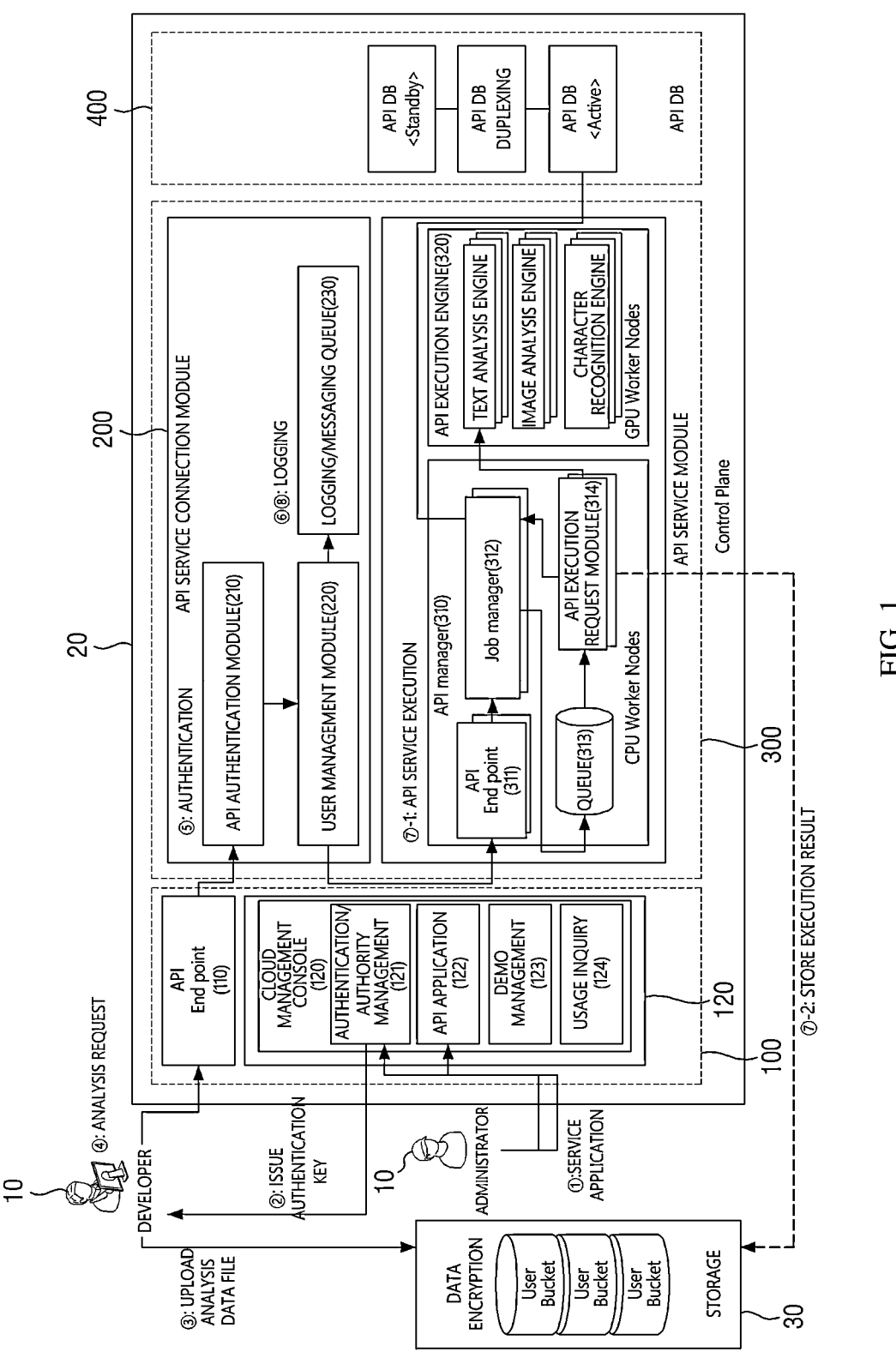
FIG. 1 is an exemplary diagram of a configuration of a system for providing a cloud-based API service according to some exemplary embodiments of the present disclosure.

FIG. 1 is an exemplary diagram of a configuration of a system for providing a cloud-based API service according to some exemplary embodiments of the present disclosure.

As illustrated in FIG. 1, a system for providing a cloud-based API service according to some exemplary embodiments may include a storage 30, a console module 100, an API service connection module 200, an API service module 300, and an API database (DB) 400. In this case, the console module 100, the API service connection module 200, the API service module 300, and the API database (DB) 400 may belong to one control plane.

Meanwhile, hereinafter, for convenience of explanation, the API service will be described assuming that it refers to a service that analyzes data using an AI model. However, it should be noted that the API service according to some exemplary embodiments of the present disclosure is not limited to the service that analyzes the data.

First, the console module 100 may include an API end point 110 that receives a data analysis request from a user (i.e., developer) terminal and requests user authentication from an API authentication module 210, an authentication/authorization management console 121 that may set and manage authentication or authorization for a user, an API application console 122 that may receive applications for one or more API services from a user (i.e., administrator) terminal, a demo management console 123 that may receive a demo version of an API service application and execution request from the user terminal, and a usage inquiry console 124 in which the user may inquire an API service usage up to a specific point in time. In addition, the console module 100 may be implemented in the form of a WEB server.

Second, the API service connection module 200 may include an API authentication module 210 that performs user authentication in conjunction with an API manager 310, a user management module 220 that checks user permissions in conjunction with the API manager 310, and a logging/messaging queue 230 that records logs and messages during the operation of the system for providing the cloud-based API service. In addition, the API service connection module 200 may be implemented in the form of a Web Application Server (WAS) server.

Third, the API service module 300 may include an API manager 310 that generates a job for an API service and an API execution engine 320 that processes the job generated through the API manager 300 and executes the API service. In this case, the API manager 310 may include an API end point 311 that receives an API service execution request after a user authentication and authorization check is completed, a job manager 312 that generates a job and a job ID, separates the job into tasks in some cases, and manages a processing status of the job, a queue 313 in which the job or the tasks are temporarily stored, and an API execution request module 314. In addition, the API manager 310 may be run on a central processing unit (CPU)-based worker node, and the API execution engine 320 may run on a graphics processing unit (GPU)-based worker node. Furthermore, the API service module 300 may be implemented in the form of a Web Application Server (WAS) server.

Meanwhile, depending on the API service method (e.g., synchronous method, asynchronous method), operations performed by the API manager 310 and the API execution engine 320 may be partially different. This will be described in detail later with reference to FIGS. 2 to 9.

Lastly, the API database (DB) 400 may store information about the job (e.g., job status information, job processing result information) in conjunction with the API service module 300. In addition, the system for providing the API service may include a storage 30 that does not belong to the control plane to which the API database 400 belongs, but may store analysis data target files uploaded by users and execution results of asynchronous API services.

Meanwhile, the user may refer to an administrator applying for the API service and a developer requesting execution of the API service. However, the user using the cloud-based API service does not necessarily have to be divided into the administrator and the developer, and the same user may apply for the API service and request execution of the requested API service at the same time.

Although not illustrated in FIG. 1, the user (e.g., administrator, developer) may use the cloud-based API service through a plurality of user terminals. In this case, the user terminal may refer to a computing device used by the user (e.g., administrator, developer) to apply for the API service through the console module 100 and acquire analysis results for data by calling the API service (e.g., data analysis service) That is, the user terminal may be implemented as various types of computing devices such as smartphones, desktops, laptops, etc., and may be implemented as any device. An example of such a computing device will be described with reference to FIG. 12.

A process of providing a cloud-based API service according to some exemplary embodiments of the present disclosure will be briefly described with reference to FIG. 1 again. First, the user (i.e., administrator) may apply for a specific API service (e.g., text analysis service) among a plurality of API services through the cloud management console module 120. In this case, the user (i.e., administrator) may set permission of the user (i.e., developer) for the service applied for along with the application for the text analysis service. Accordingly, an authentication key may be issued to a user (i.e., developer) who has permission.

Thereafter, the user (i.e., developer) may upload a data file requiring text analysis to the storage 30, and may request analysis of the data file by calling a text analysis API service. In response to the request, user authentication and permission of the user may be checked through the API service connection module 200, and when the authentication process is completed, text analysis results for the data file may be provided to the user through the API service module 300. In this case, when the text analysis API service is an asynchronous type API service, the text analysis results resulting from execution of the API service may be stored in the storage.

Accordingly, the cloud service provider may effectively reduce server and management costs by utilizing common infrastructure and middleware built in the control plane area. In addition, as the plurality of API services are provided on a cloud basis rather than on-premise, service development and operation costs may be reduced. Furthermore, through linking with various cloud products including the storage (e.g., object storage), the quality of customer service may be improved and user satisfaction and convenience may be improved.

Hereinabove, the configuration and process of the system for providing the cloud-based API service according to some exemplary embodiments of the present disclosure have been described with reference to FIG. 1. Hereinafter, a specific process by which the cloud-based API service is provided will be described in detail with reference to FIGS. 2 to 9.

Figure 2:
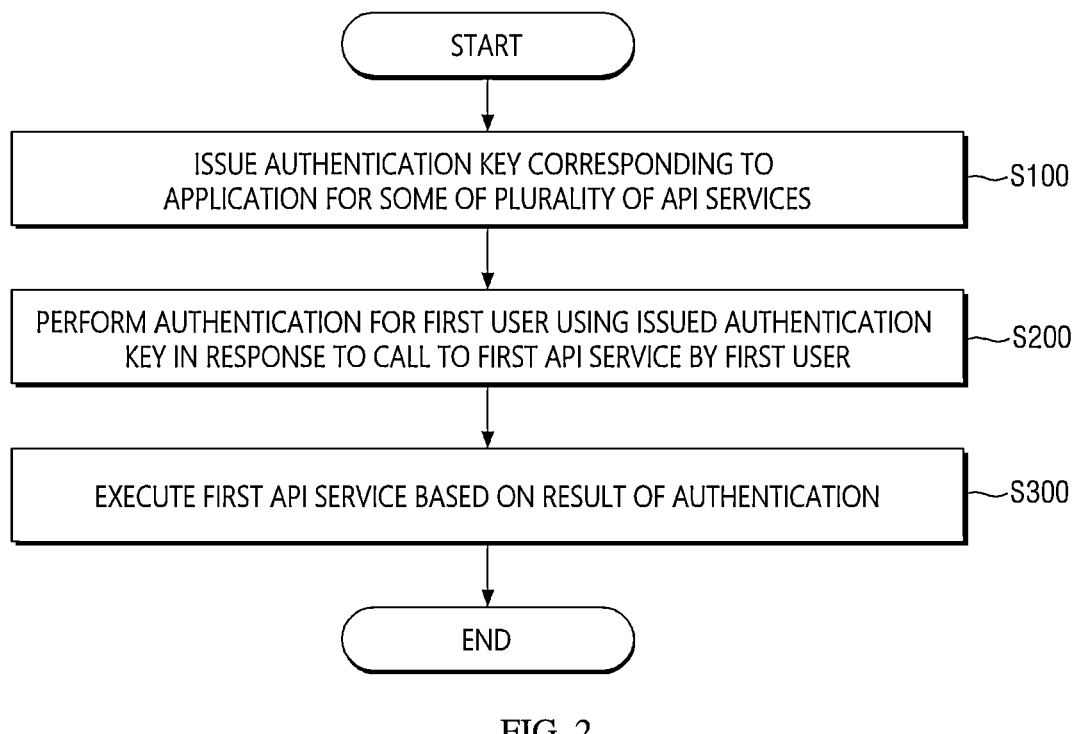
FIG. 2 is a flowchart illustrating a method for providing a cloud-based API service according to some exemplary embodiments of the present disclosure.
Figure 3:
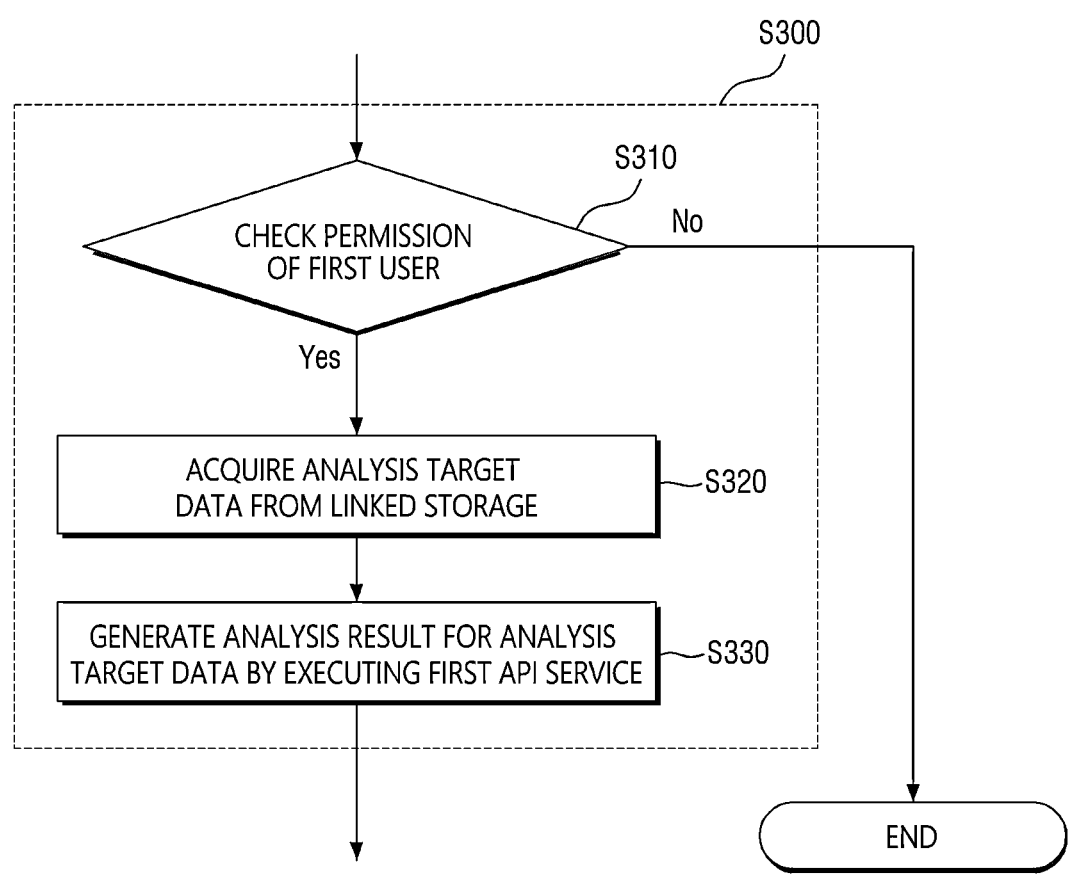
FIG. 3 is an exemplary diagram for describing some operations illustrated in FIG. 2.
Figure 4:
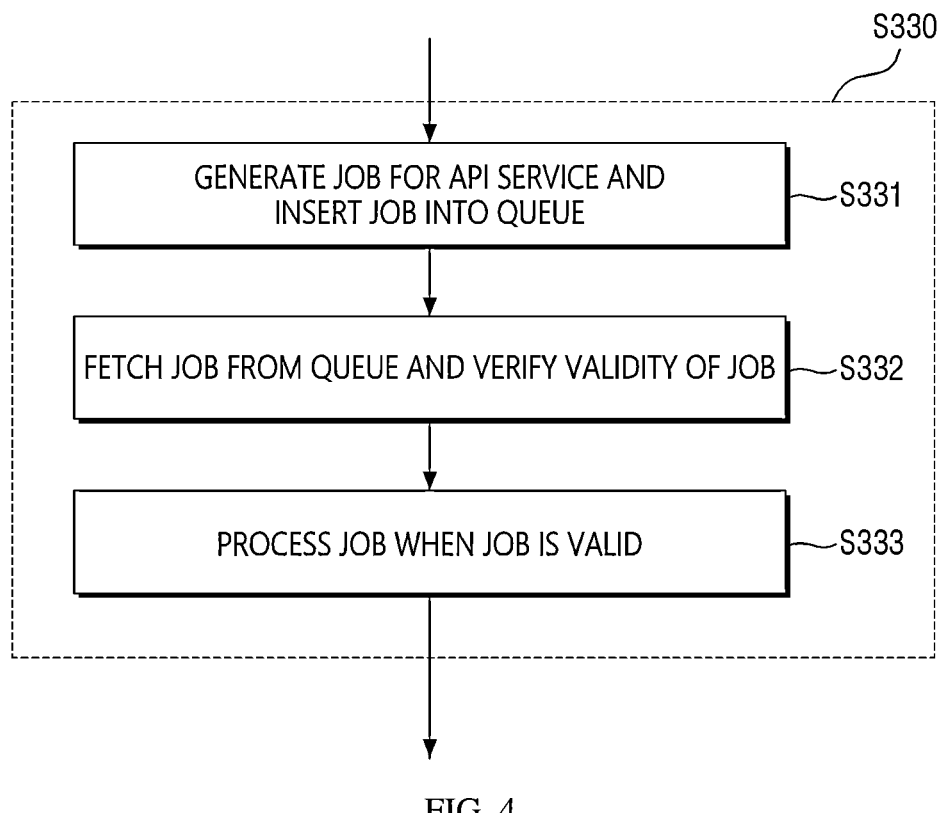
FIG. 4 is an exemplary diagram for describing some operations illustrated in FIG. 3.

Meanwhile, the subject of the steps/operations illustrated in FIGS. 2 to 4 may refer to one computing device or computing system that performs functions of a plurality of modules 100, 200, 300, and 400 belonging to the control plane 20 illustrated in FIG. 1. In other words, the plurality of modules 100, 200, 300, and 400 belonging to the control plane 20 illustrated in FIG. 1 may be implemented with at least one computing device. For example, all functions of the plurality of modules 100, 200, 300, and 400 may be implemented in one computing device, and the plurality of modules 100, 200, 300, and 400 may be implemented in a plurality of computing devices each having different functions. More specifically, the function of the console module 100 may be implemented in a first computing device, and the functions of the API service linking module 200 and the API service module 300 may be implemented in a second computing device.

The computing device may include any device having a computing function, and an example of such a device will be described with reference to FIG. 12. Since the computing device is an aggregate in which various components (e.g., memory, processor, etc.) interact, the computing device may be referred to as a "computing system" in some cases. In addition, the computing system may also refer to an aggregate in which a plurality of computing devices interact.

Furthermore, the computing device may be a server (including VM, Cloud, etc.), a desktop, a laptop, etc., but is not limited thereto and may include all types of devices equipped with a computing function. An example of the computing device will be described with reference to FIG. 12.

First, a method for providing a synchronous type API service will be described with reference to FIGS. 2 to 6.

FIG. 2 is a flowchart illustrating a method for providing a cloud-based API service according to some exemplary embodiments of the present disclosure. However, this is only a preferred exemplary embodiment for achieving the object of the present disclosure, and some steps may also be added or deleted as needed.

As illustrated in FIG. 2, a method for providing a cloud-based API service according to some exemplary embodiments of the present disclosure may begin at step S100 of issuing an authentication key corresponding to an application for some of a plurality of API services. In this case, the authentication key may be issued by the authentication/authority management module 121 of the console module 120 illustrated in FIG. 1.

In addition, the plurality of API services may be data analysis services, and more specifically, may include an Artificial Intelligence (AI)-based character recognition service, an AI-based text analysis service, and an AI-based image analysis service. Furthermore, the plurality of API services may be services that run on Graphics Processing Unit (GPU)-based worker nodes.

In step S200, in response to a call for the first API service by a first user, authentication for the first user may be performed using the issued authentication key. In this case, the authentication may be performed by the API authentication module 210 illustrated in FIG. 1.

In step S300, the first API service may be executed based on a result of the authentication. That is, when the authentication key received along with a call message for the first API service of the first user is determined to be valid, the execution result for the first API service may be provided to the user by generating and processing a job for the first API service. In this case, the first API service may be executed by the API manager 310 and API execution engine 320 illustrated in FIG. 1. Hereinafter, a specific process in which the first API service is executed will be described with reference to FIGS. 3 and 4.

FIG. 3 is an exemplary diagram for describing some operations illustrated in FIG. 2. However, this is only a preferred exemplary embodiment for achieving the object of the present disclosure, and some steps may also be added or deleted as needed.

As illustrated in FIG. 3, the step S300 of executing the first API service based on the result of the authentication through the step S200 of performing the user authentication for the first user using the issued authentication key may include step S310 of checking permission of the first user for the first API service, step S320 of acquiring analysis target data from a linked storage, and step S330 of generating an analysis result for the analysis target data by executing the first API service.

In step S310, the permission of the first user for the first API service may be checked through the user management module 220. In this case, as a result of the check, when the first user has permission, a subsequent process related to execution of the first API service may proceed, but when the first user does not have permission, the subsequent process related to execution of the first API service may not proceed, and a notification message indicating that execution is not possible may be sent to the user's terminal.

If it is checked in step S310 that the first user has permission, step S320 of acquiring analysis target data from the storage 30 linked to the API service module 300 and step S330 of generating an analysis result for the analysis target data acquired by executing the first API service may be sequentially performed. In this case, the analysis target data may be a data analysis target file (e.g., text for analysis, image file) uploaded to the storage in advance by the user. In addition, the storage may be an object storage (OBS), which stores data in units of objects.

Meanwhile, it is exemplarily illustrated in FIG. 3 that step S310 of checking permission of the first user for the first API service, step S320 of acquiring analysis target data from a linked storage, and step S330 of generating an analysis result for the analysis target data by executing the first API service are sequentially performed, but the present disclosure is not limited to such an example. That is, step S310 of checking permission of the user, and acquiring analysis target data from a storage and generating an analysis result for the analysis target data through an execution of the API service (i.e., steps S320 and S330) may also be performed in parallel.

A detailed description of the plurality of steps/operations illustrated in FIGS. 2 and 3 and each subject performing each step/operation will be described later with reference to FIG. 5.

FIG. 4 is an exemplary diagram for describing some operations illustrated in FIG. 3. However, this is only a preferred exemplary embodiment for achieving the object of the present disclosure, and some steps may also be added or deleted as needed.

As illustrated in FIG. 4, after it is checked that the user has permission, the step S330 of generating an analysis result for the analysis target data by executing the first API service may include step S331 of generating a job for the first API service and inserting the job into a queue, step S332 of fetching a job from the queue and verifying validity of the fetched job, and step S333 of processing the job when the job is verified to be valid. In this case, steps S331 to S333 illustrated in FIG. 4 may be performed by the API service module 300.

Meanwhile, the first API service may be a synchronous type API service or an asynchronous type API service. The synchronous or asynchronous type API services are set in advance, the user (i.e., administrator) may check whether the API service the user wishes to apply for is a synchronous or asynchronous type when applying for the service, and the user may apply for an API service that suits his or her needs by selecting the type the user needs.

In this case, when the first API service is the synchronous type, a step of separating the job into tasks, which are sub-concepts of the job, may not be necessary, but when the first API service is the asynchronous type, a step of separating the job into a plurality of tasks may be required. In addition, when the first API service is the asynchronous type, the execution result of the first API service may be stored in the storage linked to the API service module unlike when the first API service is the synchronous type. That is, it should be noted that the steps/operations illustrated in FIG. 4 may be partially added or changed depending on the type (i.e., synchronous/asynchronous) of the first API service.

A detailed description of the plurality of steps/operations illustrated in FIG. 4 and each subject performing each step/operation will be described later with reference to FIG. 6.

In summary, by integrally providing the plurality of API services to the user through the cloud environment, rather than individually, server and management costs may be reduced through the utilization of common infrastructure and middleware. In addition, when the user calls the API service, a service utilizing an AI model may be provided to the user flexibly and reliably in the control plane area of the cloud service provider.

Hereinafter, a specific process in which the API service is executed in response to a call of a synchronous type API service will be described in detail with reference to FIGS. 5 and 6.

Figure 5:
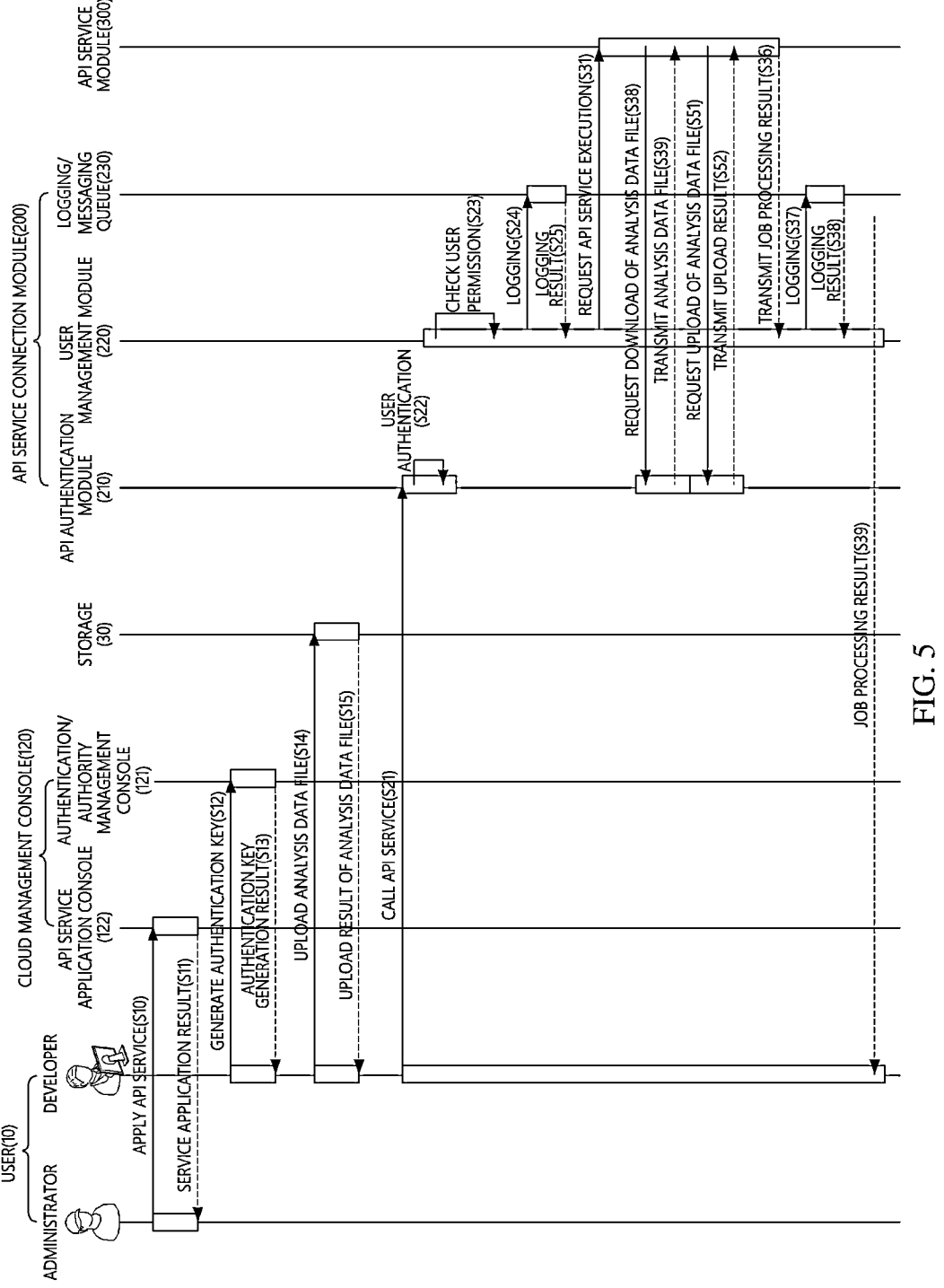
FIGS. 5 and 6 are detailed flowcharts of a method for providing a synchronous type API service according to an exemplary embodiment of the present disclosure.
Figure 6:
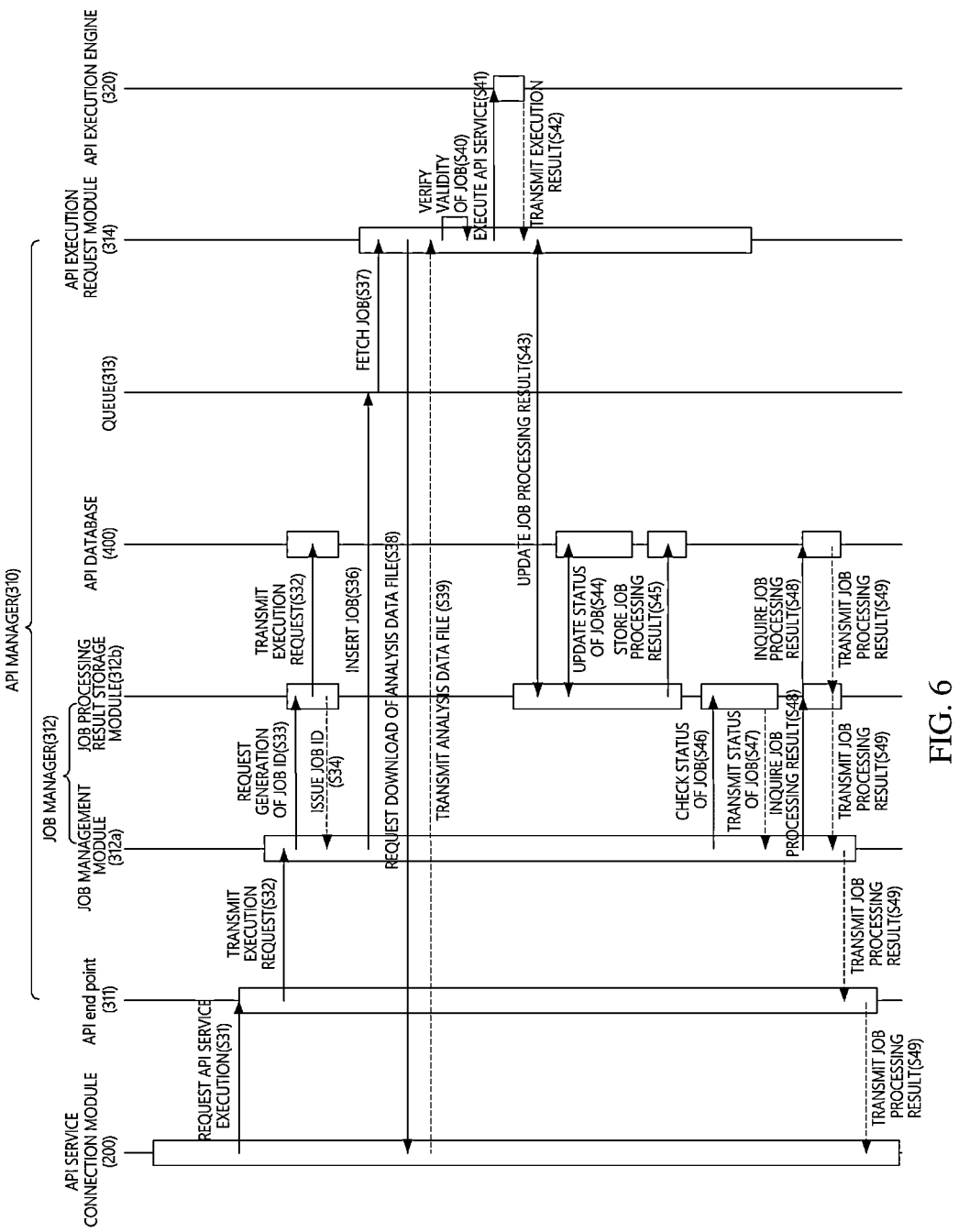

FIGS. 5 and 6 are detailed flowcharts of a method for providing a synchronous type API service according to an exemplary embodiment of the present disclosure. However, this is only a preferred exemplary embodiment for achieving the object of the present disclosure, and some steps may be added or deleted or the order of some steps may be changed as needed. In addition, each step/operation of a method for providing a synchronous type API service illustrated in FIGS. 5 and 6 may be performed by the configurations of the system for providing the cloud-based API service illustrated in FIG. 1.

As illustrated in FIG. 5, a method for providing a synchronous type API service may begin at step S10 in which a user 10 applies for an API service at a terminal of the user 10 through the API service application console 122. In this case, the user 10 may be an administrator, and the API service application console 122 may be a module included in the cloud management console 120 belonging to the console module 100. Thereafter, in step S11, the API service application console 122 may transmit a result of the API service application to the terminal of the user (i.e., administrator 10) in response to the API service application of the user 10. In this case, the result of the API service application may include details of the API service applied for by the user (i.e., administrator 10) and information on permission of each user who may use the applied API service. Hereinafter, the description will be made assuming that the API service applied for by the administrator includes a first API service (e.g., AI-based text analysis service), and the developer acquires a text analysis result by calling the first API service.

In response to the application for the first API service, the authentication/authority management console 121 may generate an authentication key (step S12) and transmit an authentication key generation result to the user (i.e., developer 10) (step S13). That is, when a call is made to the first API service by a specific user (i.e., developer) in the future, the authentication key required during the user authentication process may be issued to the user. Thereafter, the user (i.e., developer, 10) may upload an analysis target data file to the storage 30 (step S14), and the storage 30 may transmit the upload result to a terminal of the user (i.e., developer 10). The analysis target data file uploaded to the storage 30 may be transmitted to the API manager 310 according to a download request from the API service module 300 in an execution step of the first API service in the future.

Thereafter, in step S21, a call signal for the first API service may be received from the terminal of the user (i.e., developer 10). However, it is illustrated in FIG. 5 that the user calls the first API service after the analysis data file is uploaded to the storage at the user's request, but the present disclosure is not necessarily dependent on the illustrated order. That is, the analysis data file may be uploaded to the storage even after the user calls the first API service.

In response to the call signal for the first API service received from the terminal of the user (i.e., developer 10), the API authentication module 210 may perform user authentication using the authentication key previously issued to the user through steps S12 and S13 (step S22). In addition, the user management module 220 may check permission of the user preset for the first API service (step S23), and may provide the first API service only to a user having the permission as a result of the check. Thereafter, a result of the authentication and authority check may be logged through the logging/message queue 240, and the logging result may be transmitted to the user management module 220.

After the authentication and authority check procedures for the user are completed, the user management module 220 may transmit a signal requesting execution of the first API service to the API service module 300, the API service module 300 may request download of the previously uploaded analysis target data file to the storage 30 (step S38), and may transmit the analysis target data file to the API service module 300 in response to the request (step S29). The API service module 300 may process a job for the first API service generated using the analysis target data file, and may transmit a job processing result to the terminal of the user (i.e., developer 10) through the user management module 220. In this case, the job processing result may be logged through the logging/message queue 240, and the logging result may be transmitted to the user management module 220.

Meanwhile, step S51 in which the API service module 300 requests to upload the analysis result data file generated as the job processing result to the storage 30 and step S52 of transmitting the upload result to the API service module 300 in response to the request may not be performed in the process of providing the synchronous type API service. That is, steps S51 and S52 may be performed only in the process of providing the asynchronous type API service.

Hereinafter, a series of processes performed in the API service module 300 according to a synchronous type first API service execution request will be described in detail with reference to FIG. 6. In this case, the API service module 300 may include an API manager 310 including an API end point 311, a job manager 312, a queue 313, and an API execution request module 314, and an API execution engine 320.

As illustrated in FIG. 6, in step S31, the API service module 300 may receive a first API service execution request signal received from the user management module 220 belonging to the API service connection module 200. More specifically, the first API service execution request signal may be received through the API end point 311 belonging to the API manager 310 included in the API service module 300. Thereafter, in step S32, the API end point 311 may transmit the first API service execution request signal to a job management module 312*a*. In this case, the job management module 312*a* may generate a job for the first API service and manage information (e.g., job ID) related to the generated job.

The job management module 312*a* may request a job processing result storage module 312*b* to generate a job ID while generating the job for the first API service (step S33), and the job ID may be issued to the job management module 312*a* in response to the generation request (step S34). In this case, information about the generated job and job ID may be stored in the API database 400 (step S35). Meanwhile, in the asynchronous type API service, the job ID may be transmitted to the terminal of the user, and the user may use the job ID to inquire a processing status of the job at any time, but in the synchronous type API service, the job ID may not be transmitted to the user.

In addition, the job management module 312*a* may insert the job into a queue 313 (step S36), and the API execution request module 314 may fetch the job inserted into the queue 313 (step S37). In this case, before processing the job fetched from the queue 313, the API execution request module 314 may request download of the analysis target data file already uploaded by the user to the storage 30 (step S38), and may receive the analysis target data file in response to the request (step S39). In addition, the API execution request module 314 may verify validity of the job before processing the job fetched from the queue 313. In this case, the validity of the job may be verified based on at least one of an extension name of a downloaded analysis target data file and a capacity of the analysis target data file. For example, if the capacity of the analysis target data file exceeds a reference value, the job may be determined to be invalid and the job processing process may not proceed. In addition, if the analysis target data file is not a text-based file (e.g., an image file), the extension name of the analysis target data file is different, so that the job may be determined to be invalid and the job may not be processed. Meanwhile, the job generated for the first API may be processed in job units, but may also be separated into a plurality of tasks corresponding to sub-units of the job and processed in task units. This will be described later with reference to FIG. 9.

Accordingly, by first verifying the validity of the job before processing the job and processing the job only if the job is determined to be a valid job, unnecessarily wasted computing resources may be saved.

If the validity of the job is verified through step S40, the API execution request module 314 may transmit an execution request signal of the first API service to the API execution engine 320 (step S41), and the API execution engine 320 may transmit an execution result of the first API service to the API execution request module (step S42). Thereafter, when the processing of the job is completed, information about the processing result of the job may be updated through the job processing result storage module 312*b* (step S43). In addition, in step S44, information about a status of the job may be updated through the job processing result storage module 312*b* and stored in the API database 400, and in step S45, the information about the processing result of the job may be stored in the API database 400.

Meanwhile, the job management module 312*a* may continuously poll the status of the job corresponding to a job ID. More specifically, the job management module 312*a* may transmit a check request signal for the status (e.g., processing status) of the job to the job processing result storage module 312*b* (step S46), and may receive information about the status of the job as a result of the check (step S47). Thereafter, when the job management module 312*a* receives information that the status of the job is a processing completed status, it may request the job processing result storage module 312*b* to inquire about the processing result of the job, and the job processing result storage module 312*b* may request the API database 400 to inquire the processing result of the job previously stored through step S45 (step S48). In response to the inquiry request, the job processing result transmitted from the API database 400 may be passed through the job processing result storage module 312*b*, the job management module 312*a*, and the API end point 311 and finally transmitted to the terminal of the user (i.e., developer 10) (step S49).

In summary, the cloud service provider may effectively reduce server and management costs by utilizing common infrastructure and middleware built in the control plane area. In addition, as the plurality of synchronous type API services are provided on a cloud basis rather than on-premise, service development and operation costs may be reduced. Furthermore, through linking with various cloud products including the storage (e.g., object storage), the quality of customer service may be improved and user satisfaction and convenience may be improved.

In addition, when individually developing an AI-based synchronous type API service, a problem with reduced development productivity due to overlapping functions and structures and a problem of increased development and operation costs due to environments such as different architectures, development languages, middleware, and databases for each service may be solved. Furthermore, when providing the AI-based synchronous type API service, excessive operation and management costs due to inefficient use of graphic processing unit (GPU) resources may be reduced.

So far, the method for providing the synchronous type API service according to an exemplary embodiment of the present disclosure has been described with reference to FIGS. 2 to 6. Hereinafter, a method for providing an asynchronous type API service according to an exemplary embodiment of the present disclosure has been described with reference to FIGS. 7 to 9.

Figure 7:
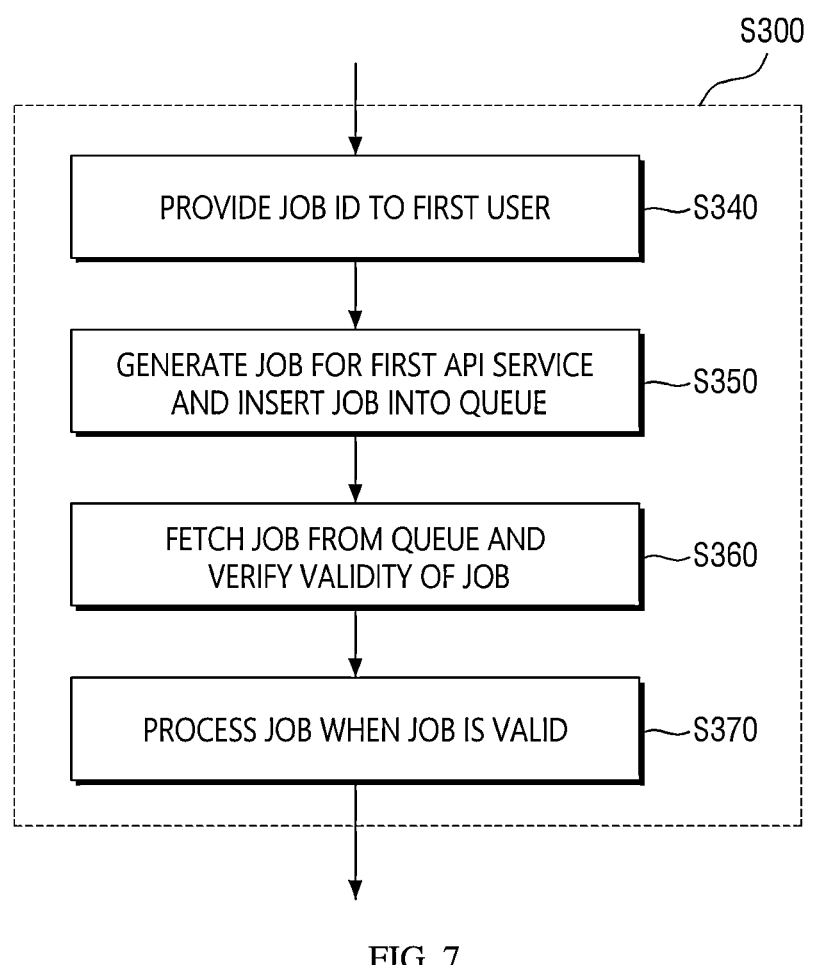
FIG. 7 is an exemplary diagram for describing some operations illustrated in FIG. 3.

FIG. 7 is an exemplary diagram for describing some operations illustrated in FIG. 3. However, this is only a preferred exemplary embodiment for achieving the object of the present disclosure, and some steps may also be added or deleted as needed.

As illustrated in FIG. 7, the step S300 of executing the first API service based on the result of user authentication, described above with reference to FIG. 1 may include step S340 of providing a job ID to the first user before generating and processing a job for the first API service, step S350 of generating the job for the first API service and inserting the job into a queue, step S360 of fetching the job from the queue and verifying validity of the job, and step S370 of processing the job when the job is valid. In addition, the steps/operations illustrated in FIG. 7 may be performed by the configurations included in the API service module 300.

In this case, the job ID may be information generated when the job for the first API service is generated, and transmitted to the user unlike the case of the synchronous type API service. Thereafter, the user may use the received job ID to inquire a processing result for a job corresponding to the job ID.

Meanwhile, since the detailed description of steps S350 to S370 overlaps with the content described above with reference to FIG. 4, the detailed description of the overlapping content will be omitted. Hereinafter, a process of separating a job into a plurality of tasks that are sub-units of the job and processes the tasks in task units, which needs to be performed in the case of the asynchronous type API service, will be described with reference to FIG. 8.

Figure 8:
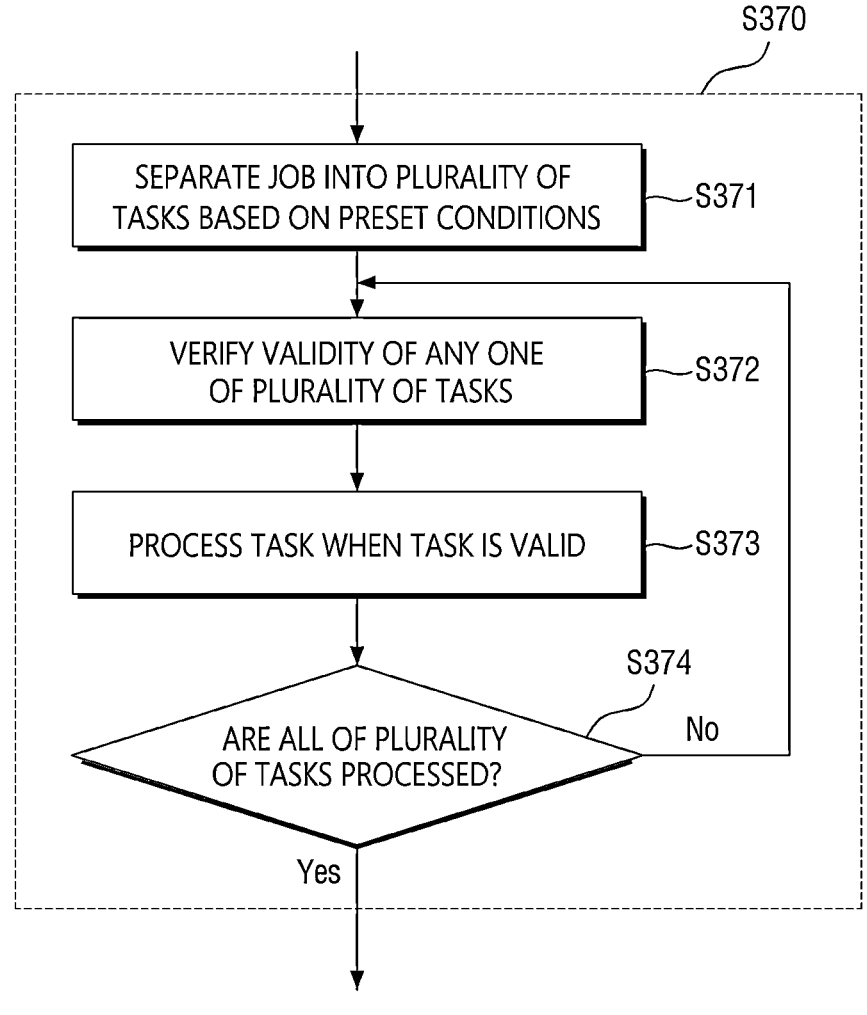
FIG. 8 is an exemplary diagram for describing some operations illustrated in FIG. 7.

FIG. 8 is an exemplary diagram for describing some operations illustrated in FIG. 7. However, this is only a preferred exemplary embodiment for achieving the object of the present disclosure, and some steps may also be added or deleted as needed.

As illustrated in FIG. 8, the step S370 of processing the job after the validity of the job is verified may include step S371 of separating the job into a plurality of tasks based on conditions preset by the user, step S372 of verifying validity of any one of the plurality of separated tasks, and step S373 of processing the task when the task is verified to be valid. In this case, the step S372 of verifying validity of any one of the plurality of tasks and the step S373 of processing the task when the task is verified to be valid may be repeatedly performed until processing for all of the plurality of tasks is completed. That is, the step S370 of processing the job may further include step S374 of determining whether all of the plurality of tasks have been processed, and step S372 of verifying validity of any one of the unprocessed tasks when all of the plurality of tasks have not been processed and step S373 of processing the task when the verification target task is valid may be sequentially performed.

Meanwhile, the validity of the task may be verified based on at least one of an extension name of an analysis target data file corresponding to the task and a capacity of the analysis target data file. For example, if the capacity of the analysis target data file corresponding to the task exceeds a reference value, the task may be determined to be invalid and the job processing process may not proceed. In addition, if the analysis target data file is not a text-based file (e.g., an image file), the extension name of the analysis target data file is different, so that the task may be determined to be invalid and the task may not be processed.

Hereinafter, a specific process in which the API service is executed in response to a call of an asynchronous type API service will be described in detail with reference to FIG. 9.

Figure 9:
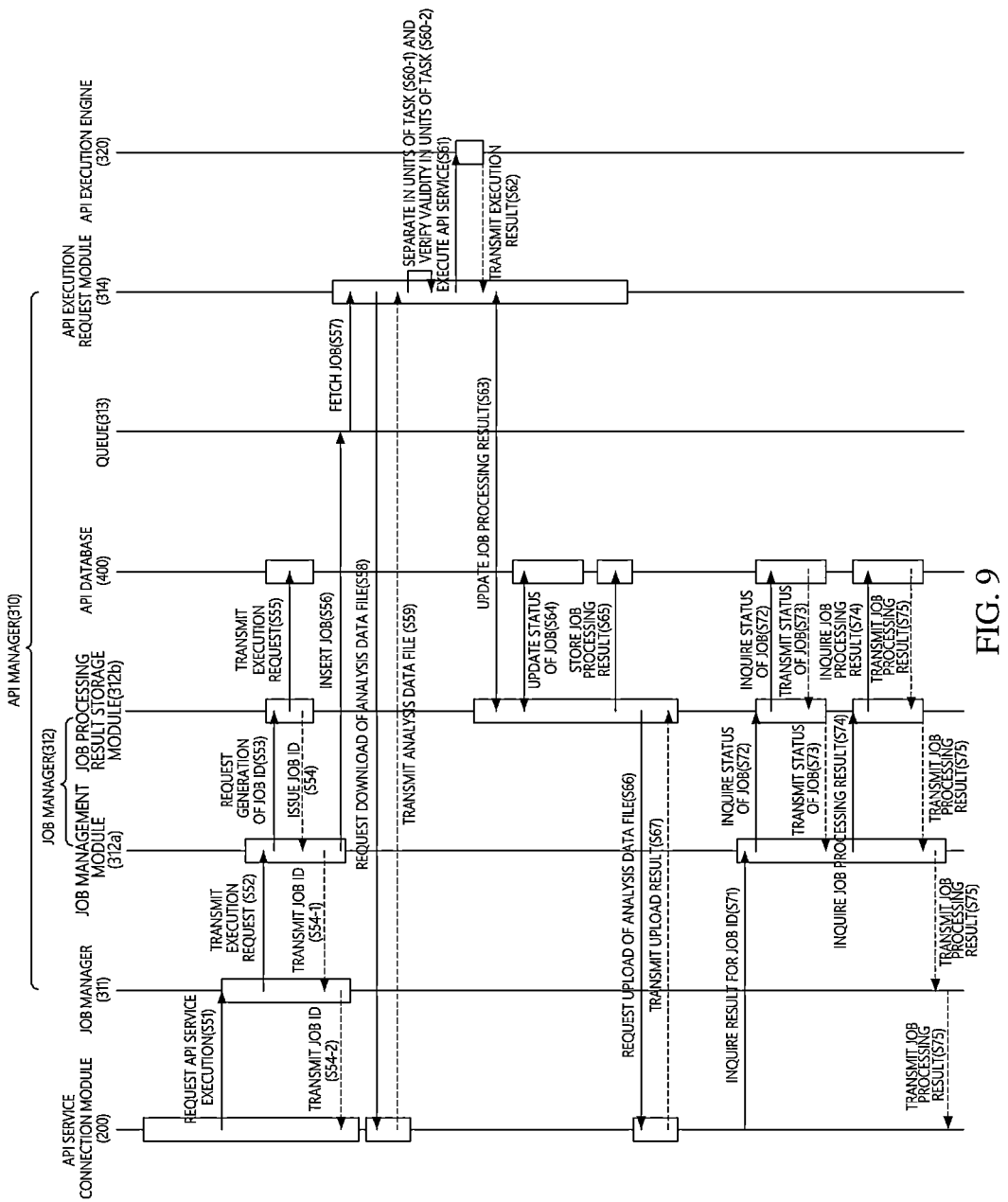
FIG. 9 is a detailed flowchart of a method for providing an asynchronous type API service according to an exemplary embodiment of the disclosure.

FIG. 9 is a detailed flowchart of a method for providing an asynchronous type API service according to an exemplary embodiment of the disclosure. However, this is only a preferred exemplary embodiment for achieving the object of the present disclosure, and some steps may be added or deleted or the order of some steps may be changed as needed.

In addition, each step/operation of a method for providing an asynchronous type API service illustrated in FIG. 9 may be performed by the configurations of the system for providing the cloud-based API service illustrated in FIG. 1. Furthermore, FIG. 9 only illustrates a series of processes performed in the API service module 300 according to an asynchronous type first API service execution request, and does not illustrate a process of checking user authentication and permission in the API service connection module 200 in response to an asynchronous type API service application through the terminal of the user (developer) and the console module 100 and an API service call of the user (i.e., developer). However, since the content not illustrated in FIG. 9 is the same as the content illustrated in FIG. 5, the description of overlapping content will be omitted below.

As illustrated in FIG. 9, in step S51, the API service module 300 may receive a first API service execution request signal received from the user management module 220 belonging to the API service connection module 200. More specifically, the first API service execution request signal may be received through the API end point 311 belonging to the API manager 310 included in the API service module 300. Thereafter, in step S52, the API end point 311 may transmit the first API service execution request signal to the job management module 312*a*. In this case, the job management module 312*a* may generate a job for the first API service and manage information (e.g., job ID) related to the generated job.

The job management module 312*a* may request the job processing result storage module 312*b* to generate a job ID while generating the job for the first API service (step S53), and the job ID may be issued to the job management module 312*a* in response to the generation request (step S54). In this case, information about the generated job and job ID may be stored in the API database 400 (step S55). Meanwhile, the job ID may be transmitted to the user's terminal (step S54-1), and the user may inquire a processing status of the job using the received job ID.

In addition, the job management module 312*a* may insert the job into the queue 313 (step S56), and the API execution request module 314 may fetch the job inserted into the queue 313 (step S57). In this case, before processing the job fetched from the queue 313, the API execution request module 314 may request download of the analysis target data file already uploaded by the user to the storage 30 (step S58), and may receive the analysis target data file in response to the request (step S59). In addition, the API execution request module 314 may verify validity of the job before processing the job fetched from the queue 313. In this case, the job may be separated into tasks that are sub-units of the job (step S60-1), and validity thereof may be verified in units of task (step S60-2). Since a plurality of tasks is a sub-unit of a job generated by separating the job, a job processing process may be understood as a process in which the plurality of tasks sequentially or simultaneously are processed. In addition, the process of verifying the validity of the job may be understood as a process in which the plurality of tasks sequentially or simultaneously are processed, and both validity verification of the job and validity verification of the task may also be performed.

Meanwhile, the validity of the job or the task may be verified based on at least one of an extension name of a downloaded analysis target data file and a capacity of the analysis target data file. For example, if the capacity of the analysis target data file exceeds a reference value, the job or the task may be determined to be invalid and the job or task processing process may not proceed. In addition, if the analysis target data file is not a text-based file (e.g., an image file), the extension name of the analysis target data file is different, so that the job or the task may be determined to be invalid and the job or the task may not be processed.

Accordingly, by first verifying the validity of the job or the task before processing the job or the task and processing the job or the task only if it is determined to be a valid job or task, unnecessarily wasted computing resources may be saved. In addition, by double verifying the validity of the job and the validity of the task, the reliability and accuracy of verification may be improved.

If the validity of the task is verified through step S30-2, the API execution request module 314 may transmit an execution request signal of the first API service to the API execution engine 320 (step S61), and the API execution engine 320 may transmit an execution result of the first API service to the API execution request module (step S62). Thereafter, when the processing of the plurality of tasks is completed (i.e., the job processing is completed), information about the processing result of the job may be updated through the job processing result storage module 312b (step S63). In addition, in step S64, information about a status of the job may be updated through the job processing result storage module 312b and stored in the API database 400, and in step S65, the information about the processing result of the job may be stored in the API database 400.

Thereafter, in step S51, the API service module 300 may request to upload analysis result data file generated as a result of job processing to the storage 30. In addition, in step S52, the storage 30 may transmit an upload result to the API service module 300 in response to the request.

Meanwhile, the job management module 312a may receive a result inquiry request signal for the job ID from the user (step S71) and may transmit a check request signal for the status (e.g., processing status) of the job to the job processing result storage module 312b, and the job processing result storage module 312b may transmit the check request signal for the status (e.g., processing status) of the job to the API database 400 (step S72). As a result of the check, the job management module 312a may receive information about the status of the job transmitted from the API database 400 through the job processing result storage module 312b (step S73).

Thereafter, when the job management module 312a receives information that the status of the job is a processing completed status, it may request the job processing result storage module 312b to inquire about the processing result of the job, and the job processing result storage module 312b may request the API database 400 to inquire the processing result of the job stored in step S65 (step S74). In response to the inquiry request, the job processing result transmitted from the API database 400 may be passed through the job processing result storage module 312b, the job management module 312a, and the API end point 311 and finally transmitted to the terminal of the user (i.e., developer 10) (step S75).

In summary, the cloud service provider may effectively reduce server and management costs by utilizing common infrastructure and middleware built in the control plane area. In addition, as the plurality of asynchronous type API services are provided on a cloud basis rather than on-premise, service development and operation costs may be reduced. Furthermore, through linking with various cloud products including the storage (e.g., object storage), the quality of customer service may be improved and user satisfaction and convenience may be improved.

In addition, when individually developing an AI-based asynchronous type API service, a problem with reduced development productivity due to overlapping functions and structures and a problem of increased development and operation costs due to environments such as different architectures, development languages, middleware, and databases for each service may be solved. Furthermore, when providing the AI-based asynchronous type API service, excessive operation and management costs due to inefficient use of graphic processing unit (GPU) resources may be reduced.

So far, the method for providing the asynchronous type API service according to an exemplary embodiment of the present disclosure has been described with reference to FIGS. 7 to 9. Hereinafter, a method for providing a demo version of an API service according to an exemplary embodiment of the present disclosure has been described with reference to FIGS. 10 and 11.

Figure 10:
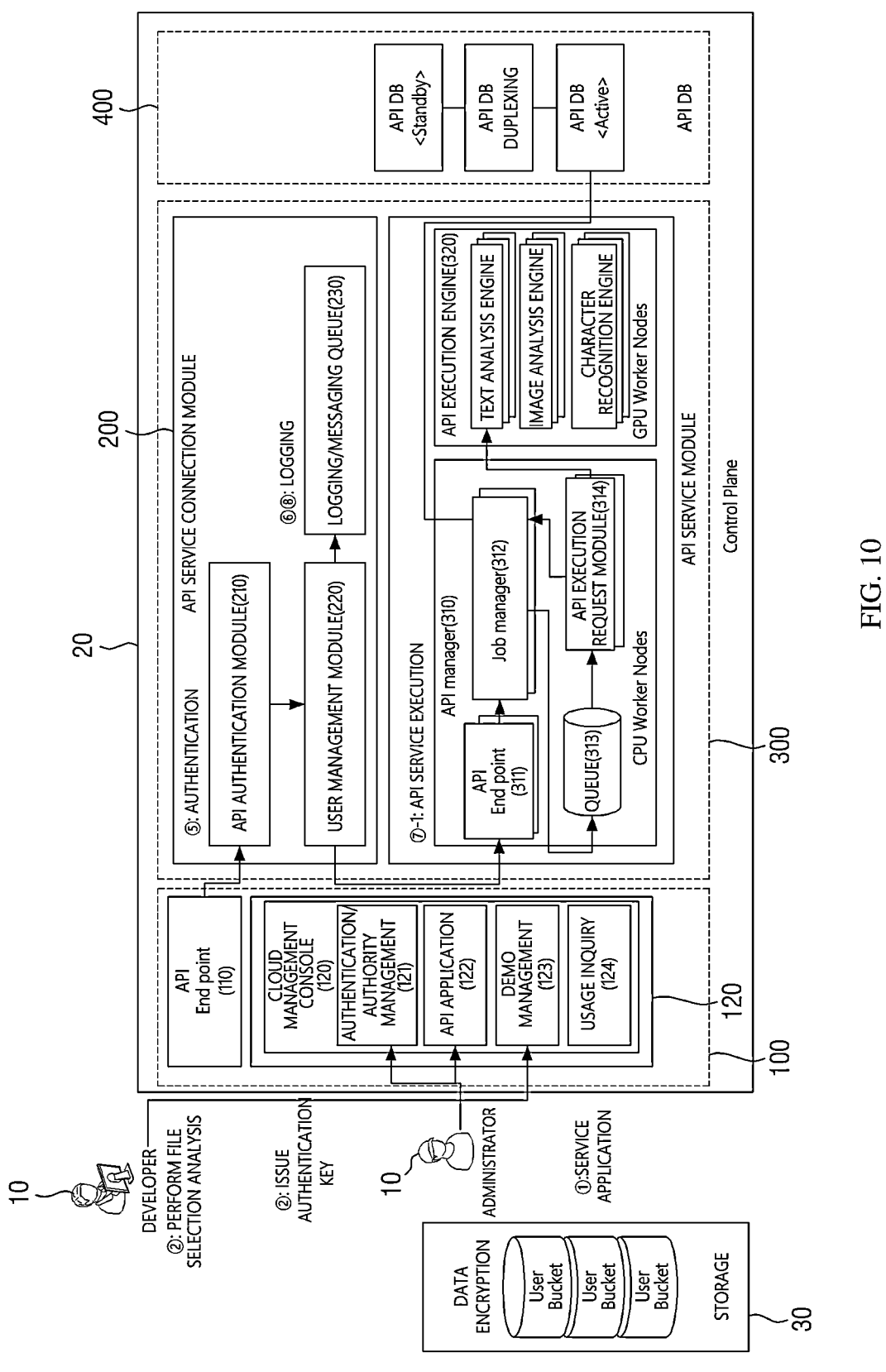
FIG. 10 is an exemplary diagram of a configuration of a system for providing a demo version of an API service according to some exemplary embodiments of the present disclosure.

FIG. 10 is an exemplary diagram of a configuration of a system for providing a demo version of an API service according to some exemplary embodiments of the present disclosure.

Since the configuration of the system for providing the demo version of the API service illustrated in FIG. 10 is the same as the configuration of the system for providing the cloud-based API service described with reference to FIG. 1, the detailed description of overlapping content will be omitted. Hereinafter, a process of providing a demo version of an API service will be briefly described with reference to FIG. 10.

First, the user (i.e., administrator) may apply for a specific API service (e.g., text analysis service) among a plurality of API services through the cloud management console module 120. In this case, the user (i.e., administrator) may set permissions of the user (i.e., developer) for the service applied for along with the application for the text analysis service.

Thereafter, the user may call a demo version of an API service through the demo management console 123 belonging to the cloud management console module 120. That is, the user may select an analysis target data file and request an analysis of the selected file. In response to the request, user authentication and permission of the user may be checked through the API service connection module 200, and when the authentication process is completed, the API service module 300 may be requested to execute the demo version of the API service. Thereafter, a text analysis results for the data file may be provided to the user through the API service module 300.

In summary, in the case of the demo version of the API service, the user may make a call for the API service through a screen of the demo management console 123 rather than through the API end point 110 of the console module 100. In this case, there is no need to issue an authentication key for the API service to the user, and the analysis target data file may not be uploaded to the storage 30 linked to the control plane 20. The analysis target data file required in the process of providing the demo version of the API service may be transmitted to the API service module 300 in another way without using the storage, for example, in Base64Data format.

Hereinafter, a specific process by which the demo version of the API service is provided will be described in detail with reference to FIG. 11.

Figure 11:
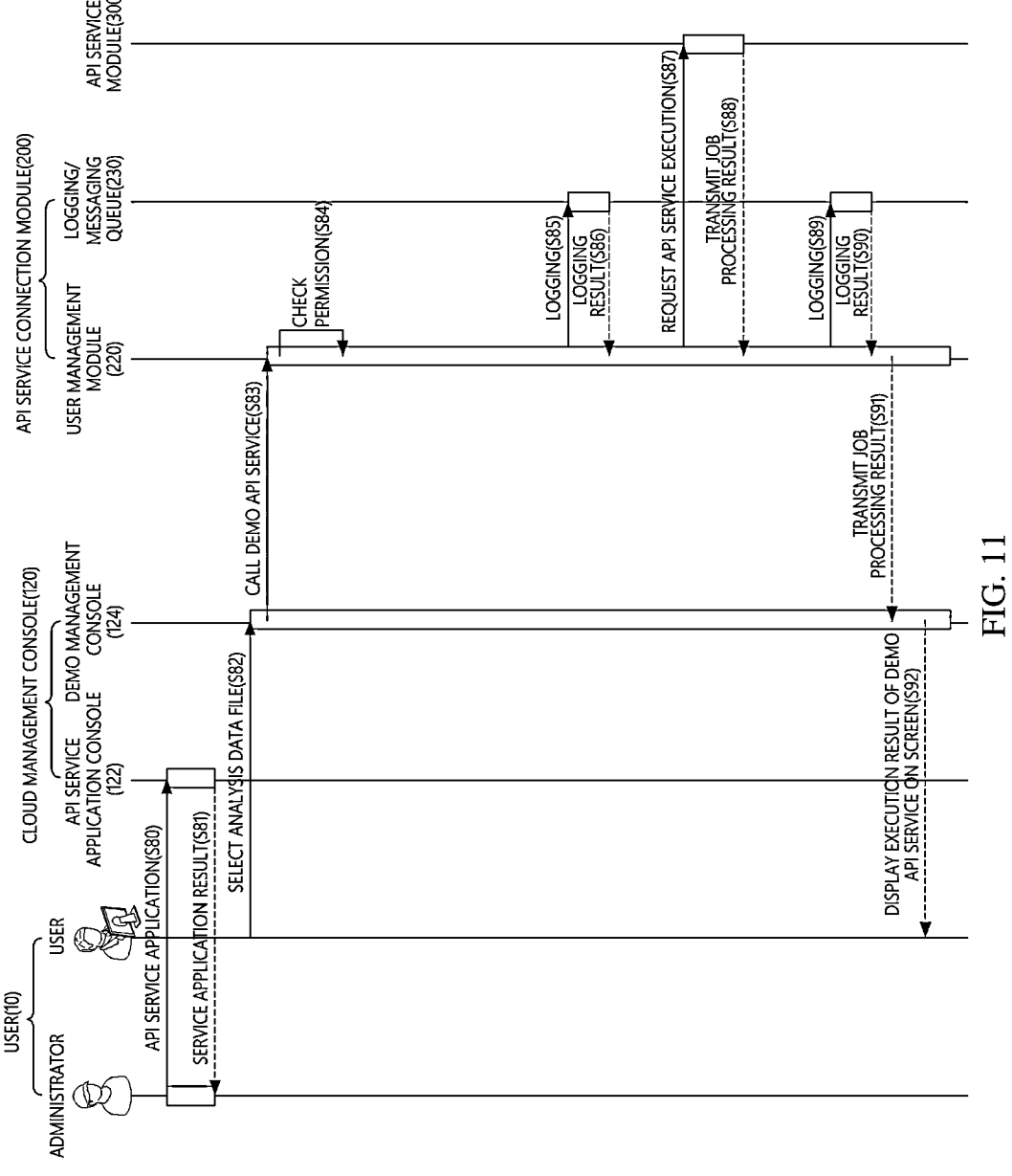
FIG. 11 is a detailed flowchart of a method for providing a demo version of an API service according to some exemplary embodiments of the present disclosure.

FIG. 11 is a detailed flowchart of a method for providing a demo version of an API service according to some exemplary embodiments of the present disclosure.

As illustrated in FIG. 11, a method for providing a demo version of an API service may begin at step S80 in which a user (i.e., administrator 10) applies for an API service at a terminal of the user 10 through the API service application console 122. In this case, the user 10 may be an administrator, and the API service application console 122 may be a module included in the cloud management console 120 belonging to the console module 100. Thereafter, in step S81, the API service application console 122 may transmit a result of the API service application to the terminal of the user (i.e., administrator, 10) in response to the API service application of the user 10. In this case, the result of the API service application may include details of the API service applied for by the user (i.e., administrator, 10) and information on permission of each user who may use the applied API service. In addition, the API service applied for by the administrator may be a first API service, which is an AI-based text analysis service, and the user may acquire a text analysis result by calling the demo version of the first API service.

The user (i.e., developer, 10) may select an analysis target data file before calling the API service of the demo and transmit the analysis target data file to the demo management console 123 (step S82). Thereafter, in step S83, the user (i.e., developer, 10) may call the demo version of the first API service through the screen of the demo management console 123. However, it is illustrated in FIG. 11 that the user calls the demo version of the first API service after the analysis target data file selected by the user, but the present disclosure is not necessarily dependent on the order illustrated above.

In response to the call for the demo version of the first API service, the user management module 220 belonging to the API service connection module 200 may check permission of the user (step S84), and as a result of the check, the demo version of the first API service may be provided only to a user having the permission. Thereafter, a result of the permission check may be logged through the logging/message queue 240 (step S85), and a logging result may be transmitted to the user management module 220 (step S86).

After the permission check procedure for the user is completed, the user management module 220 may transmit an execution request signal of the demo version of the first API service to the API service module 300 (step S87), In this case, a job processing result may be logged through the logging/message queue 240 (step S89), and a logging result may be transmitted to the user management module 220 (step S90).

Thereafter, the user management module 220 may transmit the job processing results to the demo management console 123 (step S91), and an execution result of the demo version of the API service may be displayed on the user's terminal through a screen of the demo management console 123.

So far, the method and system for providing the cloud-based API service according to some exemplary embodiments of the present disclosure have been described with reference to FIGS. 1 to 11. According to the method for providing the cloud-based API service according to some exemplary embodiments of the present disclosure, server and management costs may be reduced by utilizing common infrastructure and middleware built in the control plane area of the cloud service provider, and service development and operation costs may be reduced by utilizing integrated resources when developing or operating various AI-based API services.

Figure 12:
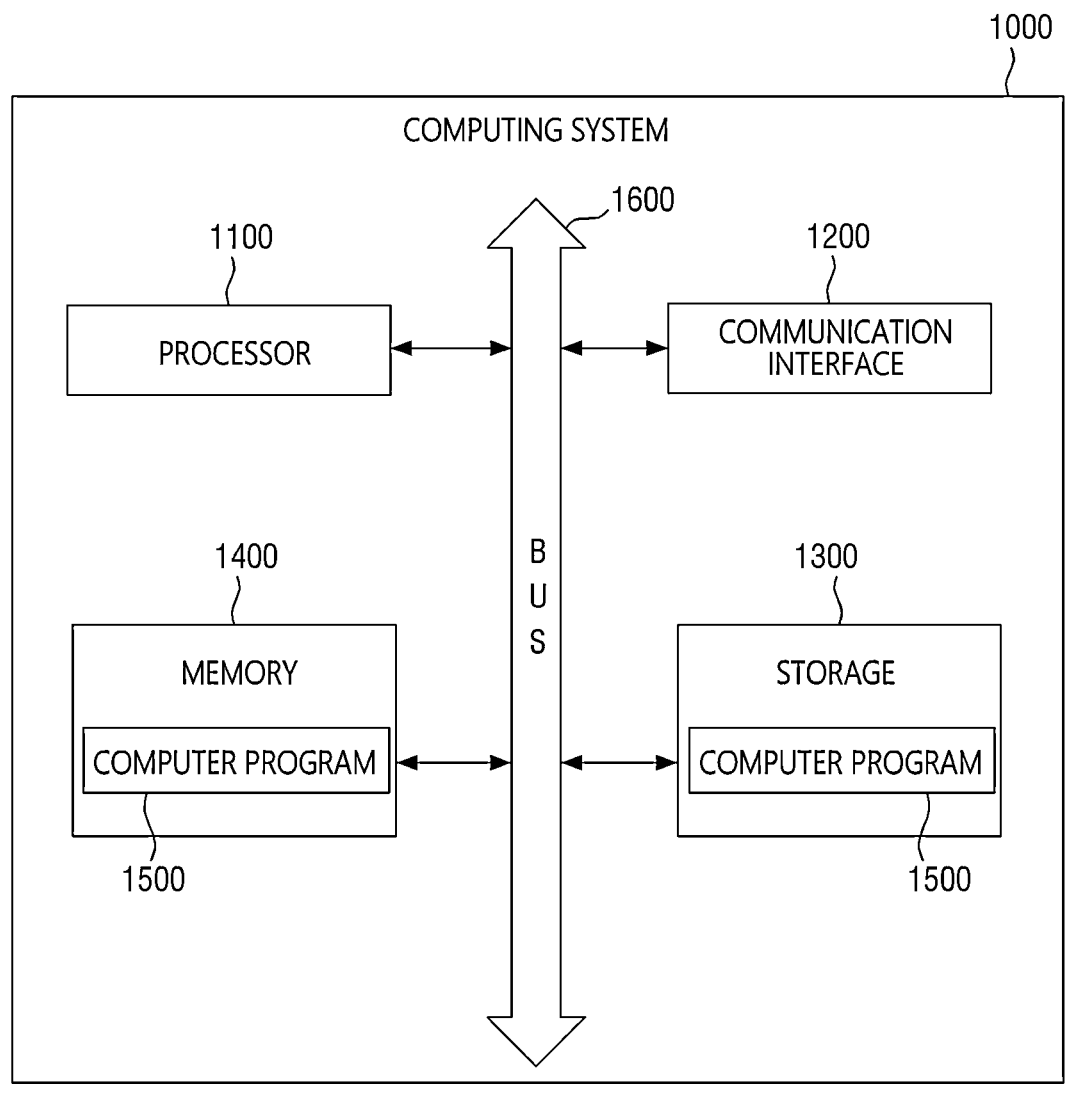
FIG. 12 is a hardware configuration diagram of a system for providing a cloud-based API service according to some exemplary embodiments of the present disclosure.

FIG. 12 is a hardware configuration diagram of a system for providing a cloud-based API service according to some exemplary embodiments of the present disclosure. A system 1000 for providing a cloud-based API service illustrated in FIG. 12 may include one or more processors 1100, a system bus 1600, a communication interface 1200, a memory 1400 for loading a computer program 1500 executed by the processors 1100, and a storage 1300 for storing the computer program 1500.

The processor 1100 controls the overall operation of each component of the system 1000 for providing the cloud-based API system. The processor 1100 may perform a calculation on at least one application or program for executing the methods/operations according to various exemplary embodiments of the present disclosure. The memory 1400 stores various data, instructions, and/or information. The memory 1400 may load one or more programs 1500 from the storage 1300 to execute the methods/operations according to various exemplary embodiments of the present disclosure. The system bus 1600 provides a communication function between components of the system 1000 for providing the cloud-based API system. The communication interface 1200 supports Internet communication of the system 1000 for providing the cloud-based API system. The storage 1300 may non-temporarily store one or more computer programs 1500. The computer program 1500 may include one or more instructions in which the methods/operations according to various exemplary embodiments of the present disclosure are implemented. When the computer program 1500 is loaded into the memory 1400, the processor 1100 may perform the methods/operations according to various exemplary embodiments of the present disclosure by executing the one or more instructions.

In some exemplary embodiments, the system 1000 for providing the cloud-based API system described with reference to FIG. 12 may be configured using one or more physical servers included in a server farm based on a cloud technology such as a virtual machine. In this case, at least some of the processor 1100, the memory 1400, and the storage 1300 among the components illustrated in FIG. 12 may be virtual hardware, and the communication interface 1200 may also be implemented as a virtualized networking element such as a virtual switch.

Embodiments of the present disclosure have been described above with reference to FIGS. 1 through 12, but it should be noted that the effects of the present disclosure are not limited to those described above, and other effects of the present disclosure should be apparent from the following description.

The technical features of the present disclosure described so far may be embodied as computer readable codes on a computer readable medium. The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

The protection scope of the present invention should be interpreted by the following claims, and all technical ideas within the equivalent range should be interpreted as being included in the scope of the technical ideas defined by the present disclosure.

What is claimed is:

1. A method for providing a cloud-based application programming interface (API) service, the method comprising:

issuing an authentication key corresponding to an application for some of a plurality of API services;

performing authentication for a first user using the issued authentication key in response to a call for a first API service by the first user; and executing the first API service based on a result of the authentication, wherein the issuing, performing, and executing are performed within an integrated control plane of a cloud service provider, and wherein the plurality of API services are artificial intelligence (AI)-based data analysis services executed on graphics processing unit (GPU)-based worker nodes managed by an API service module of the integrated control plane.

2. The method of claim 1, wherein the executing of the first API service includes:

acquiring analysis target data from a linked storage; and generating an analysis result for the analysis target data by executing the first API service.

3. The method of claim 1, wherein the plurality of API services include an artificial intelligence (AI)-based character recognition service, an AI-based text analysis service, and an AI-based image analysis service.

4. The method of claim 1, wherein the executing of the first API service includes:

checking a permission of the first user for the first API service; and executing the first API service only when the first user has the permission.

5. The method of claim 1, wherein the executing of the first API service includes:

generating a job for the first API service and inserting the job into a queue;

fetching the job from the queue and verifying validity of the job; and processing the job when the job is valid.

6. The method of claim 5, wherein the validity of the job is verified based on at least one of an extension name of the analysis target data file and a capacity of the analysis target data file.

7. The method of claim 1, wherein the first API service is an asynchronous type API service, and the executing of the first API service includes:

generating a job for the first API service and processing the generated job; and providing an ID of the job to the first user before processing the job.

8. The method of claim 7, wherein the generating of the job for the first API service and the processing of the generated job includes:

generating a job for the first API service and inserting the job into a queue;

fetching the job from the queue and verifying validity of the job; and processing the job when the job is valid.

9. The method of claim 8, wherein the processing of the job when the job is valid includes:

separating the job into a plurality of tasks based on preset conditions;

verifying validity of a first task, which is one of the plurality of tasks;

processing the first task when the first task is valid; and repeating the verifying of the validity of the first task and the processing of the first task until all of the plurality of tasks are processed.

10. The method of claim 9, wherein the validity of the first task is verified based on at least one of an extension name of an analysis target data file of the first task and a capacity of the analysis target data file of the first task.

11. The method of claim 10, further comprising uploading a processing result of the job to a storage according to an option preset by the first user.

12. The method of claim 10, further comprising providing information about a status of the job to the first user in response to a status inquiry request of the job by the first user, wherein the status inquiry request of the job includes information about an ID of the job.

13. The method of claim 1, wherein the integrated control plane comprises a console module, an API service connection module, and the API service module.

14. The method of claim 1, wherein the API service module includes an API manager configured to route a task associated with the first API service to one of the GPU-based worker nodes based on a type of the first API service.

15. A system for providing a cloud-based application programming interface (API) service, the system comprising:

a processor; and a memory configured to store instructions, the instructions cause the processor, when executed by the processor, to perform operations of:

issuing an authentication key corresponding to an application for some of a plurality of API services;

performing authentication for a first user using the issued authentication key in response to a call for a first API service by the first user; and executing the first API service based on a result of the authentication, wherein the operations are performed within an integrated control plane of a cloud service provider, and wherein the plurality of API services are artificial intelligence (AI)-based data analysis services executed on graphics processing unit (GPU)-based worker nodes managed by an API service module of the integrated control plane.

16. The system of claim 15, wherein the executing of the first API service includes:

acquiring analysis target data from a linked storage; and generating an analysis result for the analysis target data by executing the first API service.

17. The system of claim 15, wherein the first API service is an asynchronous type API service, and the executing of the first API service includes:

generating a job for the first API service and processing the generated job; and providing an ID of the job to the first user before processing the job.

18. The system of claim 17, wherein the generating of the job for the first API service and the processing of the generated job includes:

generating a job for the first API service and inserting the job into a queue;

fetching the job from the queue and verifying validity of the job; and processing the job when the job is valid.

19. The system of claim 18, wherein the processing of the job when the job is valid includes:

separating the job into a plurality of tasks based on preset conditions;

verifying validity of a first task, which is one of the plurality of tasks;

processing the first task when the first task is valid; and repeating the verifying of the validity of the first task and the processing of the first task until all of the plurality of tasks are processed.

20. The system of claim 19, wherein the validity of the first task is verified based on at least one of an extension name of an analysis target data file of the first task and a capacity of the analysis target data file of the first task.

\* \* \* \* \*